No. 746,259. PATENTED DEC. 8, 1903.
R. BAGGALEY.
PROCESS OF RECOVERING VALUES FROM SMELTER GASES.
APPLICATION FILED SEPT. 23, 1903.
NO MODEL.
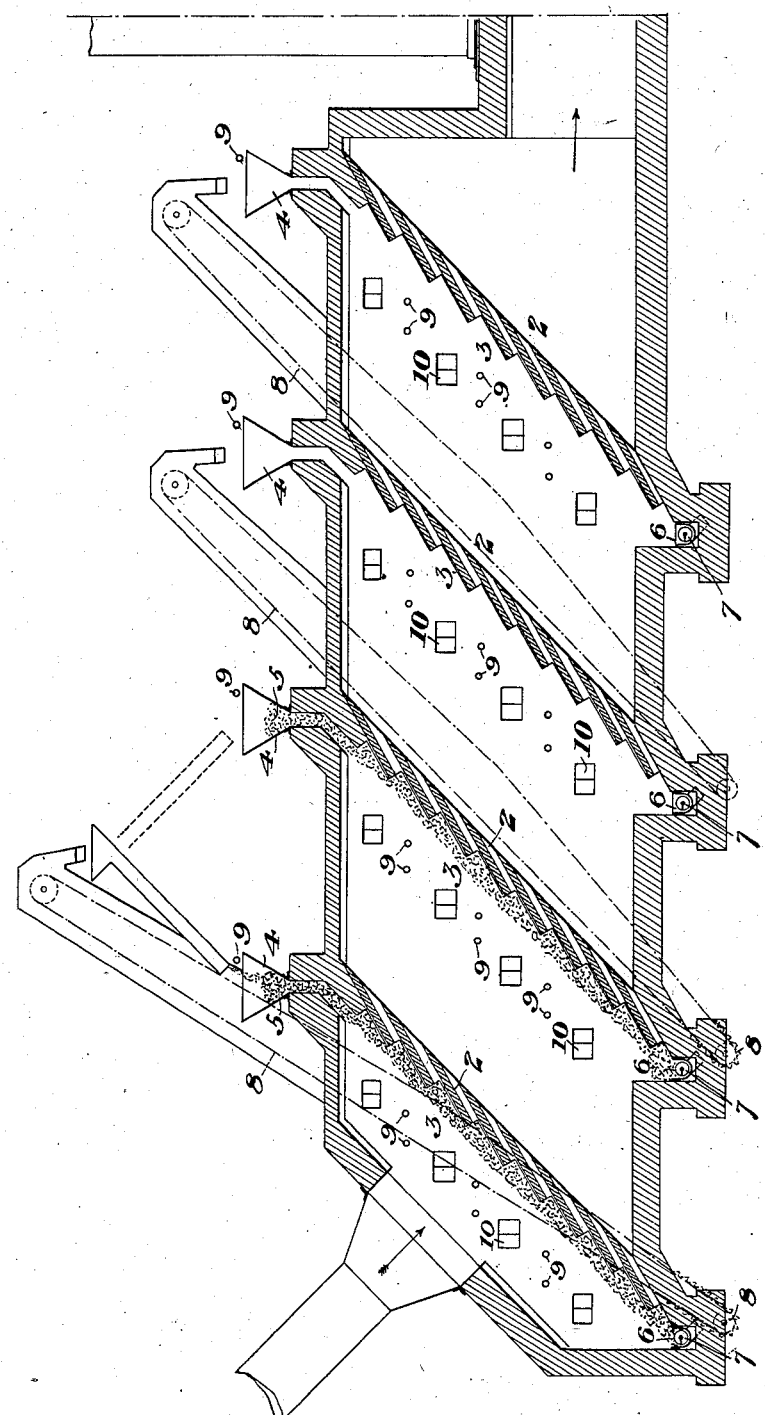
WITNESSES
INVENTOR
Ralph Baggaley
by Bakewell Byrnes
his Attorneys No. 746,259.

Patented December 8, 1903.

UNITED STATES PATENT OFFICE.

RALPH BAGGALEY, OF PITTSBURG, PENNSYLVANIA.

PROCESS OF RECOVERING VALUES FROM SMELTER-GASES.

SPECIFICATION forming part of Letters Patent No. 746,259, dated December 8, 1903.

Application filed September 23, 1903. Serial No. 174,279. (No specimens.)

*To all whom it may concern:*

Be it known that I, RALPH BAGGALEY, of Pittsburg, Allegheny county, Pennsylvania, have invented a new and useful Process of Recovering Values from Smelter-Gases, of which the following is a full, clear, and exact description, reference being had to the accompanying drawing, forming part of this specification, which shows in vertical longitudinal section apparatus suitable for the practice of my invention.

In smelting ores, such as ores of copper, the dust which is carried from the furnace by the smelter-gases often contains a considerable proportion of metallic values; but the methods heretofore proposed for recovering and briqueting them for resmelting have been lacking in efficiency. My invention provides a simple and effective mode of recovering such flue-dust and in addition thereto of purifying the smelter-gas from the noxious elements—sulfur, arsenic, &c.—which heretofore have produced destructive effects upon the vegetation surrounding the smelter plant. For this purpose I pass the smelter-gases through a chamber containing in one or more compartments or portions thereof filtering material consisting of matte, converter-slag, or other product of the smelting or refining processes containing metallic values demanding retreatment, or I may use for the same purpose many sulfid ores, and especially pyrrhotite ores, which are suitable because of their firm nature and their non-liability to pack and to prevent the passage of the furnace-gases. The surface of this material is wet with water sprayed upon it from suitable nozzles, and the material is preferably kept in motion, either intermittent or continuous, so that fresh surfaces will be exposed to the gases. These gases are in a highly-heated condition when they come into contact with the material and deposit the flue-dust upon the surface of the material in the form of an adherent crust, and when the material is finally removed from the chamber it contains not only the metallic values which it originally possessed, but the added values of the incrusted flue-dust, and thus enriched it is delivered to the smelting-furnace or reverberatory furnace for smelting and recovery of the metals therefrom.

In order that the filtering material may be utilized as efficiently as possible, I prefer to repass it through the chamber one or more times, and at each passage the layer of flue-dust thereon is increased in amount.

After the gases have passed through the value-bearing filtering material I may cause them to pass through other filtering material, preferably through a body or bodies of cracked slag, moistened with water or with an alkaline solution by which the noxious sulfur fumes or sulfur and arsenic fumes are arrested.

In the drawing, in which I show what I regard as the preferable form of apparatus for practicing the invention, 2 is a chamber set at the downtake end of the smelting-furnace and sufficiently close thereto to admit of the gases and flue-dust being received in a very hot state. In this chamber is a succession of screens, each supported, preferably, by a series of tile steps 3 3, spaced far enough apart to permit the ready passage between them of the fumes from the furnace in their flight to the stack and inclined, preferably, at an angle of about forty-five degrees. The first of the screens is composed of pieces of matte, rich converter-slag, ore, or other like material containing values fit for smelting, and the succeeding screens are preferably composed of broken furnace-slag, broken stone, gravel, water-worn boulders, or like material not containing such metallic values.

On top of the flue-chamber and immediately above the top step of each series is a hopper 4, arranged to feed the broken filtering material 5, so that it will flow readily by gravity over the steps in an unbroken layer from one side wall to the other and down to the bottom of the flue-chamber, at which point is a suitable hopper 6, so designed that all of such material must pass by gravity into it. Underneath this lower hopper is a screw conveyer 7 or equivalent device for the removal of the material after it has become fouled from the precipitated impurities. The fouled material is then delivered onto a suitable conveyer-elevator 8 or similar device by which the augmented material of the first screen is elevated again to the feed-hopper 4 for repassage through the chamber, and from the lower hoppers of the subsequent screens, which are composed of waste slag or the like, the elevator preferably delivers the fouled material into railroad-cars or into wagons for removal. As the screw conveyers below the chamber are moved slowly by machinery the screen material will be removed gradually from the bottom hopper, and the screen material above thus losing its support will move downward over the tile steps and ultimately into the lower hopper, whence it in turn will be expelled by the screw conveyer. As the material thus slides down the steps new material constantly enters from the hopper above, and thus the screen is constantly maintained throughout and over the entire inside area of the flue of a uniform thickness and in condition to perform the work intended. A spraying of water from nozzles 9 is maintained over the screen material, and these nozzles are shielded within holes in the walls.

In order to force the flue-dust and the metals or metalloids contained in the gases to precipitate upon the first moving screen, the gases must be very hot when they come into contact with it, and an abundant and continuous spraying of water over the entire surface of the screens must be maintained. The gases being very hot, the evaporation will be rapid, and to insure a successful precipitation of the metals or metalloids such rapid evaporation must be compensated for and the faces of the screen must at all times be kept wet or at least moist.

As the quantity of matte or converter-slags at any smelting plant is comparatively limited, the provision above described for passing such material repeatedly through the first screen is of practical value. The adhering crust of flue-dust is so dense and hard that many layers of it may be deposited upon the value-bearing screen material, and said material thus augmented to any extent desired. The material after having been passed once or oftener through the apparatus may be removed therefrom and treated in a blast-furnace or reverberatory furnace or in other suitable smelting or reducing apparatus. Such utilization of material containing metallic values for collecting the flue-dust and enabling it to be returned to a smelting-furnace I regard as broadly new.

The second, third, and fourth screens are intended to thoroughly arrest and to precipitate any remaining metals or metalloids in the fumes and to enable the ultimate discharge of these gases in harmless condition to the atmosphere. The material from these screens after becoming foul may be utilized as filling in underground mine-workings, for which purpose the presence of the precipitated impurities is not objectionable. To arrest and precipitate all the arsenic from the gases, it is necessary to use an alkaline solution or a dilute solution of sulfid of calcium on at least one of the filtering-screens, although a large proportion of the arsenic will be mechanically precipitated, together with the sulfur, iron, antimony, &c., by using water alone. Therefore on each screen I spray either water or an alkaline solution or a weak solution of sulfid of calcium. At most points where copper-smelters are located alkali water is available almost without cost, and this offers at once a cheap and a most excellent precipitant for any arsenic contained in the fumes.

It should be understood that the essential feature of my present invention is the precipitation of the flue-dust upon screens of value-bearing material fit for smelting or further treatment for the purpose of recovering the dust and enriching the screen material, and therefore within the scope of my claims the subsequent screens may be omitted or may be substituted by screening or filtering apparatus of other kinds and made of other materials.

The apparatus may be modified in many ways, both in respect to the shape of the screen-chamber and the nature and arrangement of the supports or holders for the screening material, since

What I claim is—

1. The method herein described of recovering valuable dust from smelter-gases, which consists in precipitating the same upon filtering material such as ore, matte or converter-slag, containing metallic values fit for reduction or smelting with the precipitated dust, whereby the values contained in both the filtering material and the precipitated dust may be recovered together, substantially as described.

2. The method herein described of recovering valuable dust from smelter-gases, which consists in precipitating the same upon wet filtering material, such as ore, matte, or converter-slag, containing metallic values fit for reduction or smelting with the precipitated dust, whereby the values contained in both the filtering material and the precipitated dust may be recovered together; substantially as described.

3. The method herein described of recovering valuable dust from smelter-gases, which consists in precipitating the same upon filtering material such as ore, matte, or converter-slag, containing metallic values fit for reduction or smelting with the precipitated dust, whereby the values contained in both the filtering material and the precipitated dust may be recovered together, and subsequently smelting such material with the precipitated flue-dust; substantially as described.

In testimony whereof I have hereunto set my hand.

RALPH BAGGALEY.

Witnesses:
THOMAS W. BAKEWELL,
H. M. CORWIN.